US008015361B2

(12) United States Patent  (10) Patent No.: US 8,015,361 B2
Sathaye et al.  (45) Date of Patent: Sep. 6, 2011

(54) MEMORY-CENTRIC PAGE TABLE WALKER

(75) Inventors: Sumedh W. Sathaye, Austin, TX (US); Gordon Taylor Davis, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 11/956,625

(22) Filed: Dec. 14, 2007

(65) Prior Publication Data
US 2009/0157975 A1    Jun. 18, 2009

(51) Int. Cl.
 *G06F 12/00*    (2006.01)
(52) U.S. Cl. ........................................ 711/138; 711/202
(58) Field of Classification Search .................. 711/138, 711/202
 See application file for complete search history.

(56) References Cited

U.S. PATENT DOCUMENTS

| | | | |
|---|---|---|---|
| 5,960,463 A * | 9/1999 | Sharma et al. ................. | 711/206 |
| 6,012,132 A | 1/2000 | Yamada et al. | |
| 6,088,780 A | 7/2000 | Yamada et al. | |
| 6,741,258 B1 * | 5/2004 | Peck et al. ..................... | 345/568 |
| 7,353,445 B1 * | 4/2008 | Barreh et al. ................. | 714/758 |
| 7,363,491 B2 * | 4/2008 | O'Connor ..................... | 713/166 |
| 2002/0065989 A1 * | 5/2002 | Chauvel et al. ............... | 711/130 |
| 2003/0079103 A1 * | 4/2003 | Morrow ......................... | 711/206 |
| 2006/0136680 A1 * | 6/2006 | Borkenhagen et al. ........ | 711/154 |
| 2006/0224815 A1 | 10/2006 | Yamada et al. | |
| 2006/0259734 A1 | 11/2006 | Sheu et al. | |
| 2006/0277357 A1 * | 12/2006 | Regnier ............................ | 711/6 |
| 2007/0038839 A1 * | 2/2007 | Hummel et al. ............... | 711/207 |
| 2007/0038840 A1 * | 2/2007 | Hummel et al. ............... | 711/207 |
| 2007/0168644 A1 | 7/2007 | Hummel et al. | |
| 2008/0209130 A1 * | 8/2008 | Kegel et al. .................... | 711/135 |
| 2009/0158003 A1 * | 6/2009 | Sathaye et al. ................. | 711/206 |

\* cited by examiner

*Primary Examiner* — Shane M Thomas
(74) *Attorney, Agent, or Firm* — Josh G. Cockburn; Julius B. Kraft

(57) ABSTRACT

The page table walker is moved from its conventional location in the memory management unit associated with the data processor to a location in main memory i.e. the main memory controller. As a result, an implementation is provided wherein the processing of requests for data could selectively avoid or bypass cumbersome caches associated with the data processor.

7 Claims, 2 Drawing Sheets

Enhanced Processor System with Memory-Centric Page Table Walker

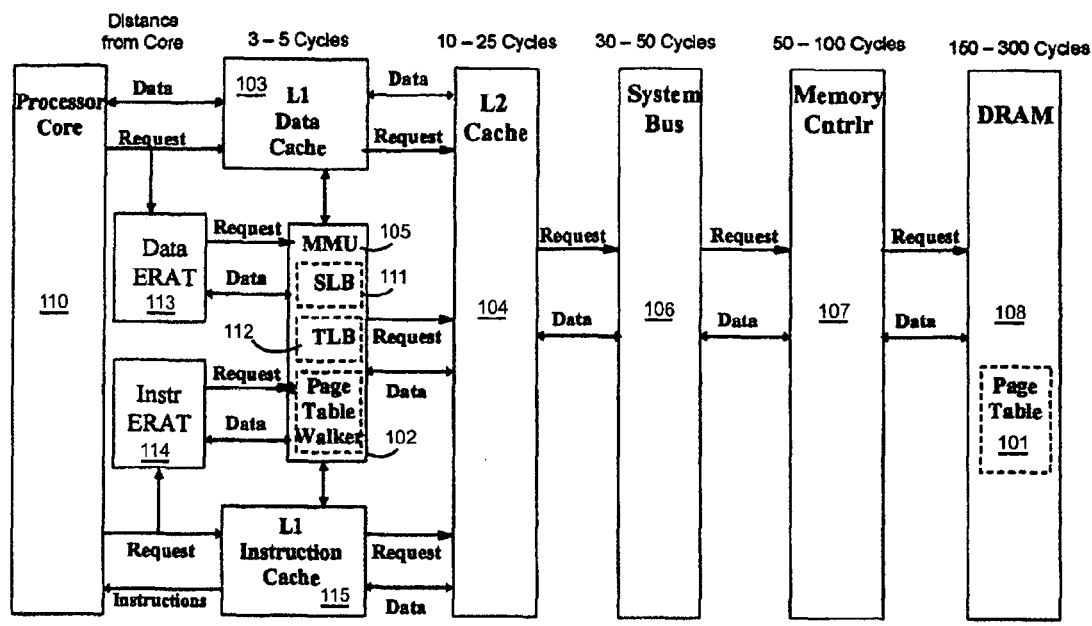
Figure 1: Typical Processor System

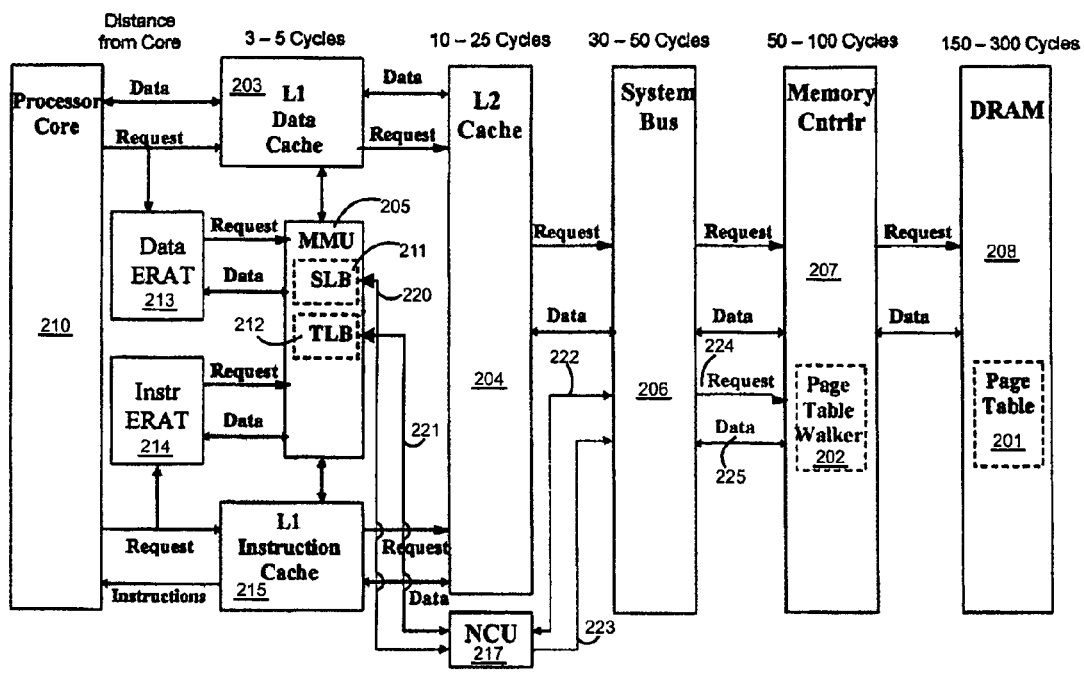
Figure 2: Enhanced Processor System with Memory-Centric Page Table Walker

MEMORY-CENTRIC PAGE TABLE WALKER

TECHNICAL FIELD

The present invention relates to computer memory management, particular to page tables in such memories and more particularly to page table walkers.

BACKGROUND OF RELATED ART

Memory addressing in the computer's main memory, i.e. the fast semiconductor storage (RAM) directly connected to the computer processor, conventionally uses paging to implement virtual memory. During such paging, the virtual address space is divided into fixed size units or blocks called pages. Each page can be mapped to any physical address corresponding to a hardware location available in the system. Conventionally, a memory management unit (MMU) operates a selected paging algorithm to determine and maintain the current mappings from the virtual to physical addresses using one or more page tables. When an address is received from an execution unit in the processor, the MMU will translate virtual to physical address using the page tables. The page tables are conventionally stored in the main memory, and page table walker is invoked to access the page tables, and provide appropriate translation. The computer memory management art is always seeking implementations for improving speed and efficiency of page table walkers. The present invention provides an implementation for improving the speed and effectiveness of page table walkers.

In order to better understand the prior art status of page table walkers, reference is made to FIG. 1 which is a generalized representation of a conventional computer memory system using page tables 101 and a page table walker 102. The memory includes several levels of cache 103-104, a memory management unit 105 for address translation, system bus 106, memory controller 107, and main memory (DRAM) 108.

When the processor 110 executes memory access instructions (e.g. load, store), it presents an "Effective Address" to the data cache L1 103. The Memory Management Unit (MMU) 105 converts the "Effective Address" into a "Physical Address" required for accessing the data (including in some systems, an intermediate "Virtual Address"). Within the MMU 105, the SLB (Segment Look-aside Buffer) 111 supports translation from Effective to Virtual Addresses, and the TLB (Translation Look-aside Buffer) 112 supports translation from Virtual to Real Addresses. In some systems, ERATs (Effective-to-Real Translation) caches 113 and 114 cache a limited number of previous Effective-to-Real translations in anticipation of their reuse. If the required translation is found in an ERAT 113-114, the process within the MMU 105 can be bypassed. A similar process occurs when the processor fetches new instructions for execution. Once the physical address is determined, it may be used to validate an entry found in the L1 instruction cache 115 or if no match is found in the L1 cache 115, the physical address is presented to the L2 cache 104. In cases where there is also no match found in the L2 104 cache, the physical address is propagated to the memory subsystem to access the required data.

A unique address translation is required for each memory page; a page may contain 4 KBytes, 64 KBytes, or other larger amounts of DRAM 108 storage. The TLB 112 contains an entry for each of the most recently required translations, but occasionally an address will be presented to the MMU 105 that doesn't have a matching translation in the TLB 112. When this happens, a TLB miss is declared, and the Page Table Walker 101 is activated to search the complete Page Table stored in DRAM 108. The page table walker 101 typically includes a hash function, followed by one or more memory accesses, and the processing individual PTEs (page table entries) in the resulting data to locate the required PTE. Once the Page Table Walker 108 has retrieved the required Page Table Entry (PTE), this new PTE is used to complete the required address translation, and the pending memory access process continues as with normal accesses. The new PTE displaces another PTE within the TLB 112, based on time since last use. An LRU (last recently used) mechanism similar to that used in caches determines which previous TLB 112 entry to displace.

A limitation in many existing implementation of page table walkers 102 is that the page table walker typically retrieves a full cache line of data from the page table 101 in DRAM, even though the required PTE is a fraction of that size. For example in the Power PC™ architecture, as many as eight PTE's fit within a 128 byte cache line. Moving eight times the required data across system buses from memory 108 to the MMU 105 results in unproductive power dissipation. If the desired entry is not found in the first memory access, a second access may be required, adding additional delay and power dissipation Compounding this problem, each cache line fetched by the page table walker displaces some other cache line in the L2 cache 104, even though it is highly unlikely that the page table data will be used again while it is still in the cache.

It has been observed that page table data within the L2 cache 104 can adversely impact the L2 cache hit rate for normal user data. Therefore, it would be desirable to develop a way of updating the TLB 112 while avoiding the excess power dissipation as well as interference with user data in the L2 cache 104, as described hereinabove.

SUMMARY OF THE INVENTION

The present invention provides a solution which reduces the undesirable effects described above. In its broadest aspects, this invention involves the recognition that moving the page table walker from its conventional location in the memory management unit to a location in main memory i.e. the main memory controller, many of the above described effects could be minimized. As a result, an implementation is provided wherein the processing of requests for data could selectively avoid or bypass cumbersome caches associated with the data processor.

The present invention provides a computer system comprising a data processor unit connected to a main memory in which the data processor unit includes a memory management unit for controlling the conversion of an address of requested data received from a processor into a physical address of said requested data; and in which, the main memory includes apparatus for storing the data being accessed in pages at the physical addresses, a page table accessed by the memory management unit for converting to said page addresses, and the page table walker for proceeding through the entries in said page table.

The main memory includes a random access memory (RAM), preferably DRAM and a memory controller for controlling said random access memory; and the memory controller contains the page table walker.

The data processor further includes at least one data cache for storing recently requested data, and apparatus in its associated memory management unit for checking received data requests against data stored in said cache. The present invention provides apparatus, the memory management unit for selectively bypassing the cache so that a data request is connected directly to said page table walker in the memory controller for address conversion. This selective bypassing involves deciding whether a data request checks for the requested data in the cache or if a data request bypasses said cache and is connected directly to page table walker for conversion. This decision may be based upon whether there is a flag in the address of the requested data.

The present invention enables a plurality of said processor connected to one main memory, and use the same page table walker in the main memory.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 1 shows a generalized view of a conventional main memory and an associated processor unit in the prior art.

FIG. 2 shows a generalized embodiment of the main memory and an associated processor unit in the present invention.

DETAILED DESCRIPTION OF PREFERRED EMBODIMENTS

FIG. 1 showing the prior art has been described hereinabove in the background of the invention.

FIG. 2 shows a generalized embodiment of the present invention. In general, the following elements perform the same functions in the embodiment of FIG. 2 that their corresponding items marked Inn etc. perform in the prior art embodiment described hereinabove with respect to FIG. 1: Processor Core 210, Data ERAT 213, Instr ERAT 214, L1 Data Cache 203, L1 Instruction 215, L2 Cache 204, System Bus 206, Memory Cntrlr 207, DRAM 208, and Page Table 201. Comparing FIG. 2 with FIG. 1, it can be seen that the Page Table Walker 202 has been removed from the MMU 205, and placed within the Memory Controller 207. A path has also been added from the MMU 205 through the NCU (Non Cache Unit) which is a cache bypass via request lines 220 and 223, then via System Bus 206 and request line 224 to the Page Table Walker 202 now within the Memory Controller 207. When a TLB (translation look aside buffer) 212 "miss" is detected, the MMU (memory management unit) 205 generates a non-cacheable read using the Virtual Address (or Effective Address if there is no SLB (segment look aside buffer) 211 of the pending memory access as the address of the non-cacheable read. This request may be flagged via a special command code, inserted into the data request, as a Page Table only search. This will result in the routing to the cache bypass via the NCU 217 and System Bus 206 to the Page Table Walker 202 within the Memory controller 207 subsystem.

Once the request reaches the Page Table Walker 202, any virtual address is hashed, a block of memory is accessed, and that data is scanned for a PTE (page table entry) that matches the virtual Address. Upon identification of the desired PTE, the entry is returned as the response to the request via data line 225, bus 206, data line 222, NCU 217, and data line 221.

The page table walker embodiment shown in FIG. 2 may be adapted to a multi-processor system, wherein a single page table is shared among all processors in order to avoid conflicting uses of memory segments. Such an arrangement would enable multiple processors to share a single page table walker. Even in large systems with multiple memory controllers, a page table can be fit within a single DRAM, and thus the page table walker need only to be included within the one memory controller for the DRAM containing the Page Table.

For circuit development purposes, the processor 210, MMU 205, NCU 217 and all of the caches may be integrated into a semiconductor chip separate from the semiconductor chip incorporating memory controller 207 and DRAM 208.

In some existing non-homogeneous systems, a full-function processor may control multiple special purpose processors. In some cases, the complexity of a full MMU (memory management unit) is removed from the special purpose processors, and the full-function processor takes on the responsibility of handling TLB updates on the special purpose devices via appropriate software. This adds significant latency and overhead. The present invention may enable these special purpose processors to update their TLBs by using the main processor's memory table walker. This enables the special purpose processors to remain simple, but at the same time avoids the latency of a software update.

The page table walker may include an enhanced function to anticipate the need of the next sequential page, and complete the page table walk to access the corresponding PTE (page table entry). Such an anticipated PTE could be cached in a single entry cache within the page table walker. In the case of a page table walker supporting multiple processors, this PTE cache could include one entry for each processor. This prefetch action could be configured to always acquire the next sequential PTE (i.e. via setting a configuration bit), or it could be triggered by detecting two consecutive page table walks from the same core that has accessed PTE's for sequential pages. It should be noted that fast access should be possible most of the time to the PTEG (page table entry group) containing the PTE for the next sequential page since the hash used for the page table should place PTE's for sequential pages in sequential PTEG positions.

Although certain preferred embodiments have been shown and described, it will be understood that many changes and modifications may be made therein without departing from the scope and intent of the appended claims.

What is claimed is:

1. A computer system comprising:
    at least one data processor unit connected to a main memory;
    each of said at least one data processor units comprising:
        a memory management unit for controlling the conversion of an address of requested data received from a processor into a physical address of said requested data;
        a data cache for storing recently requested data;
        a translation unit in said memory management unit for checking received data requests against data stored in said data cache; and
        a connector for bypassing said data cache;
    said main memory comprising:
        storage for the data being accessed in pages at said physical addresses;
        a page table accessed by said memory management unit for converting to said page addresses;
        a random access memory (RAM); and
        a memory controller for controlling said RAM, wherein said memory controller includes a page table walker for proceeding through the entries on said page table;
    wherein a data request is connected directly to said page table walker in the memory controller, via said connector for bypassing said data cache, for address conversion;

wherein said translation unit determines if the data cache is to be bypassed based upon a flag in the address of the requested data.

2. The computer system of claim 1, wherein requested data is returned directly to said memory management unit via said connector for bypassing said data cache.

3. The computer system of claim 1, wherein said at least one data processing unit comprises a plurality of data processor units, each data processor unit of the plurality of data processing units connected to said main memory.

4. The computer system of claim 1, wherein said at least one data processor unit and said main memory are respectively integrated into separate semiconductor circuit chips.

5. In a computer system comprising at least one data processor unit connected to a main memory, a method for converting an address of requested data received from a processor into a physical address of said requested data, the method comprising:
  storing the data being accessed in pages at said physical address in said main memory; and
  converting said address of requested data into said physical address using a page table stored in said main memory including steps of proceeding through entries on said page table using a page table walker stored in said main memory;
  storing recently requested data in a cache,
  checking received data requests against data stored in said cache, and
  enabling the bypassing of said cache wherein a data request may be connected directly to said page table walker in said memory controller for address conversion;
  determining, based upon a flag in an address of the data request, whether the data request requires the checking of said data in said cache or whether the data request bypasses said cache and is connected directly to page table walker for conversion.

6. The method of claim 5, further comprising: returning requested page data directly to a memory management unit by bypassing said cache.

7. The method of claim 5, wherein said at least one data processing unit comprises a plurality of data processor units, each data processor unit of the plurality of data processor units connected to said main memory.

* * * * *